(12) United States Patent
Raja

(10) Patent No.: US 11,717,462 B2
(45) Date of Patent: Aug. 8, 2023

(54) ELECTRIC WALKING ASSISTING VEHICLE

(71) Applicant: SUZUKI MOTOR CORPORATION, Hamamatsu (JP)

(72) Inventor: Gopinath Raja, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 489 days.

(21) Appl. No.: 16/868,499

(22) Filed: May 6, 2020

(65) Prior Publication Data

US 2020/0352815 A1 Nov. 12, 2020

(30) Foreign Application Priority Data

May 8, 2019 (JP) ................................ 2019-088411

(51) Int. Cl.
*A61H 3/04* (2006.01)
*B60B 19/00* (2006.01)
(Continued)

(52) U.S. Cl.
CPC .............. *A61H 3/04* (2013.01); *A61G 5/041* (2013.01); *B60B 19/003* (2013.01); *B60L 3/08* (2013.01);
(Continued)

(58) Field of Classification Search
CPC ................ A61H 3/04; A61H 2003/006; A61H 2003/043; A61H 2003/046;
(Continued)

(56) References Cited

U.S. PATENT DOCUMENTS 3,966,220 A 6/1976 Forsyth et al.
4,128,258 A 12/1978 Johnson
(Continued)

FOREIGN PATENT DOCUMENTS

CN 1214313 4/1999
CN 104718100 6/2015
(Continued)

OTHER PUBLICATIONS

Office Action dated Mar. 2, 2022 issued in Chinese Patent Application No. 202010305314.8.
(Continued)

*Primary Examiner* — Minnah L Seoh
*Assistant Examiner* — Marlon A Arce
(74) *Attorney, Agent, or Firm* — Cozen O'Connor

(57) ABSTRACT

An electric walking assisting vehicle configured such that in accordance with operating amounts acting on an operation part, driving of driving motors is controlled and includes an inclination detector which detects inclination of a vehicle body in a forward-backward direction, and on flat land where inclination is less than a threshold, with an operation origin of the operation part as a center, the driving motors are controlled to generate torque in a forward direction by operation of pushing the operation part forward and to generate torque in a backward direction by operation of pulling the operation part backward, on an uphill road on which the inclination is the threshold value or more, the operation origin is shifted to an pulling operation side, and on a downhill road on which the inclination is the threshold value or more, the operation origin is shifted to a pushing operation side.

7 Claims, 6 Drawing Sheets

(51) Int. Cl.
  *B62D 11/04* (2006.01)
  *A61G 5/04* (2013.01)
  *B60L 3/08* (2006.01)
  *B60L 15/36* (2006.01)
  *A61H 3/00* (2006.01)

(52) U.S. Cl.
  CPC .............. *B60L 15/36* (2013.01); *B62D 11/04* (2013.01); *A61H 2003/006* (2013.01); *A61H 2003/043* (2013.01); *A61H 2003/046* (2013.01); *A61H 2201/1207* (2013.01); *A61H 2201/1635* (2013.01); *A61H 2201/5061* (2013.01); *A61H 2201/5069* (2013.01); *A61H 2201/5071* (2013.01); *A61H 2203/0431* (2013.01); *B60L 2200/24* (2013.01)

(58) Field of Classification Search
  CPC .... A61H 2201/1207; A61H 2201/1635; A61H 2201/5061; A61H 2201/5069; A61H 2201/5071; A61H 2203/0431; A61H 2201/1215; A61H 2201/1633; A61G 5/041; B60B 19/003; B60B 2200/26; B60B 19/12; B60L 3/08; B60L 15/36; B60L 2200/24; B60L 2200/30; B60L 2240/16; B60L 2240/423; B60L 2240/642; B60L 15/2018; B60L 50/20; B60L 2250/24; B62D 11/04; Y02T 10/64; Y02T 10/72
  See application file for complete search history.

(56) References Cited

U.S. PATENT DOCUMENTS

| | | | |
|---|---|---|---|
| 4,613,151 A | | 9/1986 | Kielczewski |
| 5,746,282 A | * | 5/1998 | Fujiwara ............. B60L 15/2009 180/6.5 |
| 5,782,483 A | | 7/1998 | Rogers et al. |
| 6,505,707 B1 | * | 1/2003 | Berry ........................ E06C 1/12 182/20 |
| 6,530,445 B1 | | 3/2003 | Flowers et al. |
| 6,536,544 B1 | | 3/2003 | Egawa et al. |
| 7,293,625 B2 | | 11/2007 | Kumazawa |
| 7,300,061 B1 | * | 11/2007 | Omstead ................ B62D 63/06 280/400 |
| 8,894,346 B2 | | 11/2014 | Lewis |
| 9,321,475 B2 | * | 4/2016 | Weber ....................... B62B 9/28 |
| 9,650,061 B2 | * | 5/2017 | Katayama ............. G08C 17/02 |
| 9,889,874 B1 | | 2/2018 | Clause |
| 10,906,573 B2 | * | 2/2021 | Chung .................. B62B 5/0073 |
| 2003/0098196 A1 | | 5/2003 | Yanaka |
| 2004/0094999 A1 | | 5/2004 | Volotsenko |
| 2006/0011398 A1 | * | 1/2006 | Kamen .................. B62D 53/02 180/218 |
| 2006/0137931 A1 | | 6/2006 | Berg et al. |
| 2008/0223649 A1 | | 9/2008 | Wandeler |
| 2008/0277190 A1 | | 11/2008 | McCord et al. |
| 2008/0290622 A1 | | 11/2008 | Okada |
| 2010/0084831 A1 | | 4/2010 | Wang |
| 2011/0087416 A1 | | 4/2011 | Patmore |
| 2011/0088961 A1 | | 4/2011 | Case et al. |
| 2014/0083225 A1 | | 3/2014 | Downs et al. |
| 2015/0258898 A1 | | 9/2015 | Matsuda |
| 2015/0359699 A1 | | 12/2015 | Chang et al. |
| 2017/0001656 A1 | * | 1/2017 | Katayama ................ A61H 3/04 |
| 2017/0080000 A1 | * | 3/2017 | Hodgson .................. A61P 3/00 |
| 2019/0359246 A1 | | 11/2019 | Lee |
| 2022/0192095 A1 | * | 6/2022 | Barkey .................. A01D 34/66 |

FOREIGN PATENT DOCUMENTS

| | | |
|---|---|---|
| CN | 106828758 | 6/2017 |
| EP | 3000456 | 3/2016 |
| JP | H10-248879 | 9/1998 |
| JP | 2000-005239 | 1/2000 |
| JP | 2001-048497 | 2/2001 |
| JP | 2005-328914 | 12/2005 |
| JP | 2006-103512 | 4/2006 |
| JP | 2009-183407 | 8/2009 |
| JP | 2015-047307 | 3/2015 |
| JP | 2016-010558 | 1/2016 |
| JP | 2016-168153 | 9/2016 |
| JP | 2017-006580 | 1/2017 |
| JP | 2017-012546 | 1/2017 |
| WO | WO 98/41182 | 9/1998 |
| WO | WO 2012/118263 | 9/2012 |
| WO | WO 2015/181996 | 12/2015 |

OTHER PUBLICATIONS

Office Action dated Jan. 20, 2021 issued in French Patent Application No. FR2002202.
Exparte Quayle Office Action dated Oct. 15, 2021 issued in U.S. Appl. No. 16/837,700.
Suzuki exhibits the concept model "kupo" at "2020, Shibuya. Let's experience the daily life of super welfare", Development of a walking assistance vehicle with the function of an electric wheelchair. URL: https://www.suzuki.co.jp/release/c/2018/1102/, Nov. 2, 2018, Publisher: Suzuki Motor Corporation.
Office Action dated May 21, 2021 issued in U.S. Appl. No. 16/593,052.
Office Action dated Jan. 17, 2023 issued in Japanese Patent Application No. JP 2019-088411.

\* cited by examiner

ELECTRIC WALKING ASSISTING VEHICLE

FIELD OF THE INVENTION

The present invention relates to an electric walking assisting vehicle.

DISCUSSION OF THE RELATED ART

A push cart-type electric walking assisting vehicle for a user bearing a burden in walking, such as the elderly, has been developed. For example, JP 2009-183407 discloses a walking aid device in which a pedestrian pushes a handle part, back electromotive force generated in driving motors is thereby detected by torque exerted on wheels, and based on this back electromotive force, the driving motors are controlled.

In this device, unless a user pushes the device and the wheels starts moving, the motors are not driven, thereby leading to the problems in that a burden exerted on an initial motion is increased on an uphill road and a burden exerted on steering is increased. In addition, similarly, when baggage of the user is loaded thereon, problems are worsened in that a burden exerted on an initial motion is increased due to a weight of the loaded baggage and a burden exerted on steering is increased.

SUMMARY OF THE INVENTION

In view of the abovementioned problems of the conventional technology, the present invention has been devised. An object of the present invention is to provide an electric walking assisting vehicle which can obtain operability also on an uphill road or the like, which conforms to that on flat land.

To achieve the abovementioned object, an electric walking assisting vehicle according to the present invention includes: a vehicle body having a forward-backward direction and a width direction; driving wheels being driven by a driving motor mounted on the vehicle body; driven wheels provided in positions away from the driving wheels in the forward-backward direction of the vehicle body; and an operation part provided on an upper portion of the vehicle body so as to enable a user in a standing and walking posture to grip the operation part, the electric walking assisting vehicle is configured such that in accordance with an operating amount acting on the operation part, driving of the driving motor is controlled, the electric walking assisting vehicle includes an inclination detection part detecting an inclination in the forward-backward direction of the vehicle body, on flat land on which the inclination is less than a threshold value, with an operation origin of the operation part as a center, the driving motor is controlled so as to be caused to generate torque in a forward direction by operation of pushing the operation part forward and to generate torque in a backward direction by operation of pulling the operation part backward, on an uphill road on which the inclination is the threshold value or more, the operation origin is shifted to an pulling operation side, and on a downhill road on which the inclination is the threshold value or more, the operation origin is shifted to a pushing operation side.

By employing the above-described configuration, the electric walking assisting vehicle according to the present invention is operable to move forward and backward by operation of pushing the operation part and operation of pulling the operation part, and on an uphill road, an operation origin is shifted to a pulling operation side, thereby performing control of increasing torque of the driving motors, and on a downhill road, the operation origin is shifted to a pushing operation side and braking is thereby applied by the driving motors, thus allowing operability which conforms to that on flat land to be obtained.

DETAILED DESCRIPTION OF THE DRAWINGS

Hereinafter, an Embodiment of the present invention will be described in detail with reference to the accompanying drawings.

Figure 1:
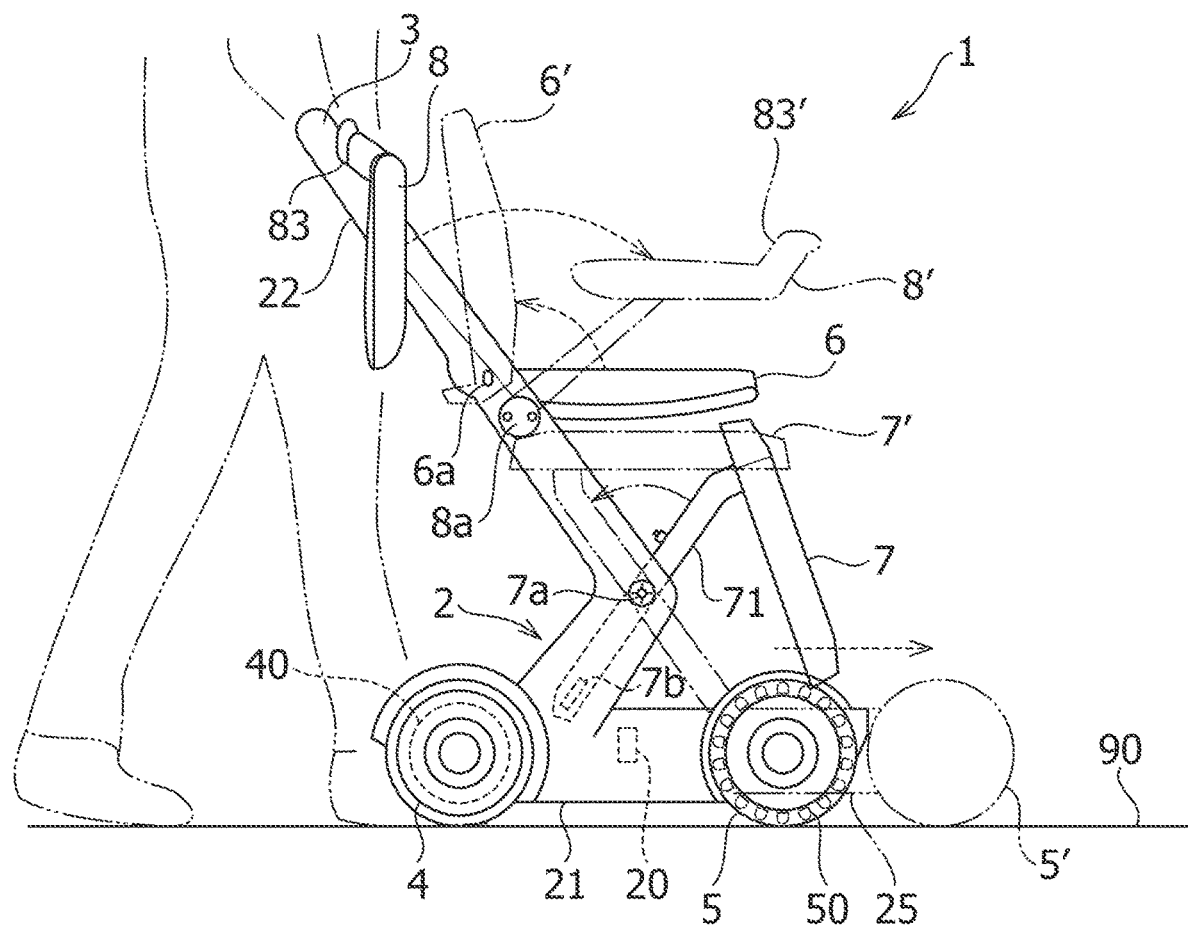
FIG. 1 is a side view showing an electric walking assisting vehicle according to an Embodiment of the present invention.

In FIG. 1, an electric walking assisting vehicle 1 according to the Embodiment of the present invention includes a vehicle body 2 which is constituted of a lower traveling body 21 on which a battery is mounted and an upper frame 22 which is installed in a standing manner from a rear portion of the lower traveling body 21 above the lower traveling body 21. On an upper end of the upper frame 22, an operation part 3 is provided. On rear ends of the lower traveling body 21, left and right driving wheels 4 are provided, and on front ends thereof, left and right driven wheels 5 are provided.

The left and right driving wheels 4 are independently driven by left and right driving motors 40L and 40R which are mounted on the lower traveling body 21. The left and right driven wheels 5 are constituted of omni wheels, each of which includes, in a treading portion thereof, a multitude of rollers 50 which can rotate around an axis in a circumferential direction. The electric walking assisting vehicle 1 can be steered, driven, and braked only by controlling the driving motors 40L and 40R by means of left and right grips 32 of the operation part 3.

The electric walking assisting vehicle 1 according to the Embodiment has an electric walking assisting vehicle mode, indicated by a solid line in FIG. 1, and a compact electric vehicle mode, indicated by a two-dot chain line in FIG. 1.

The lower traveling body 21 is configured such that front parts 25 which are provided with the driven wheels 5 are extendable and contractible in a front-rear direction with respect to a rear part (main body part) which is provided with the driving wheels 4 and the upper frame 22. On the other hand, on the upper frame 22, a lower end part (6a) of a seat back 6, leg parts 71 (7a) of a seat cushion 7, and base parts (8a) of armrests 8 are pivotably supported by shafts 6a, 7a, and 8a which are in parallel with one another in a vehicle width direction, and lower ends of the leg parts 71 are coupled to the front parts 25 via coupling parts 7b.

By employing the above-described configuration, shifting from the electric walking assisting vehicle mode indicated by the solid line in FIG. 1 to the compact electric vehicle mode is conducted such that by raising the seat back 6 to be moved to a seating position 6' and rotating the seat cushion 7 rearward to be moved to a seating position 7' as indicated by the two-dot chain line in FIG. 1, the front parts 25 of the lower traveling body 21 are extended forward, and by laying down the armrests 8 forward, the compact electric vehicle mode in which a user is seated thereon and by operating an operation part 83, self-traveling can be performed, is set.

Note that in the electric walking assisting vehicle mode indicated by the solid line in FIG. 1, an upper surface (back surface) of the seat back 6 laid down forward serves as a loading space of baggage. In this case, by keeping the armrests 8 laid down forward as indicated by a two-dot chain line 8' in FIG. 1, the upper surface of the seat back 6 can also be used as a drop prevention guard for the baggage placed on the upper surface of the seat back 6.

Figure 2A:
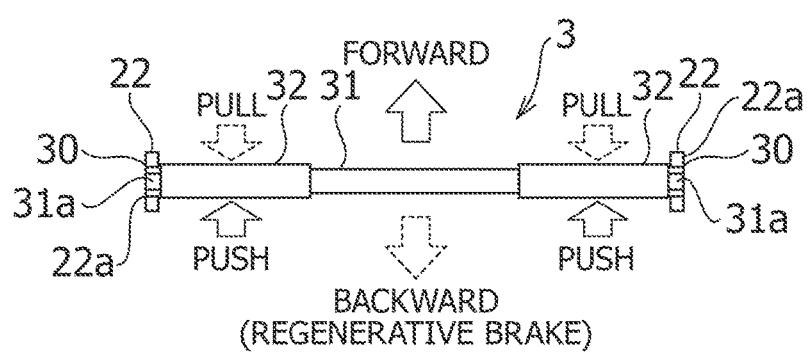
FIG. 2A is a plan view showing forward-backward operation of a gripping part.

FIGS. 2A to 2D show a configuration and an operation method of the operation part 3 in the electric walking assisting vehicle mode. As shown in FIG. 2A, the operation part 3 includes: a handle bar 31 which extends in the vehicle width direction; grips 32 which are provided on left and right sides of the handle bar 31; supporting bodies 31a which support left and right side end portions of the handle bar 31 in a state in which the supporting bodies 31a pass through supporting holes 22a of the upper frame 22; and operating amount sensors 30 which are inserted between the supporting bodies 31a on the left and right sides and the supporting holes 22a.

The operating amount sensors 30 are to detect forces, with which a user pushes the left and right grips 32 forward and pull the left and right grips 32 rearward, as operating amounts and as the operating amount sensors 30, load sensors such as piezoelectric elements can be used.

Figure 2B:
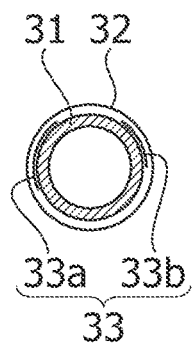
FIG. 2B is a cross-sectional view of the gripping part.
Figure 2C:
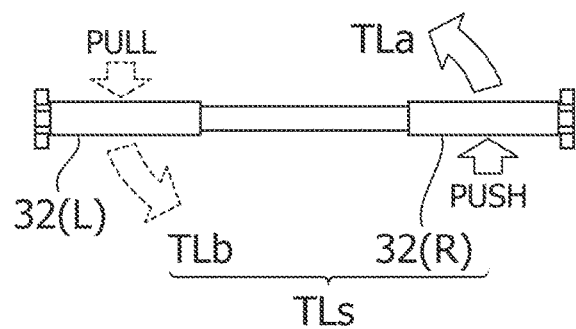
FIG. 2C is a plan view showing turning-left operation.
Figure 2D:
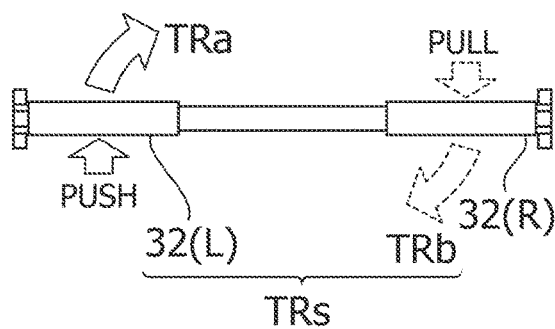
FIG. 2D is a plan view showing turning-right operation, of the electric walking assisting vehicle according to the Embodiment of the present invention.

Furthermore, as shown in FIG. 2B, in order to detect gripping of the grips 32 by a user, gripping sensors 33 (33a and 33b) are inserted between the handle bar 31 and the grips 32, respectively. As these gripping sensors 33, touch sensors such as capacitance sensors and pressure-sensitive sensors can be suitably used.

As the gripping sensors 33 in the present Embodiment, the sensor 33a which is located on a palm side (thumb side) in a state in which a user grips the grips 32 and the sensor 33b which senses a finger side (each finger other than the thumb) are included. When contacting of the sensors 33a and 33b on both sides is detected, a gripping state in which the grips 32 are gripped is determined, and when contact of either one of the sensors 33a and 33b is detected, it is determined that a hand or a finger or fingers are merely placed thereon, thereby allowing the gripping state to be reliably detected.

Next, a basic operation method in the electric walking assisting vehicle mode will be described.

Forward: As indicated by a solid line in FIG. 2A, when a user pushes the grips 32 on both left and right sides forward and the operating amount sensors 30 on both left and right sides detect forward loads, each of which is a predetermined value or more, both left and right electric motors 40L and 40R are driven to rotate in a forward direction, and the electric walking assisting vehicle 1 moves forward and assists forward walking of a user. Note that a difference between values detected by the left and right operating amount sensors 30 is disregarded, the left and right electric motors 40L and 40R are driven to rotate basically at numbers of revolutions which are same as each other.

Backward: As indicated by a broken line in FIG. 2A, when a user pulls the both left and right grips 32 toward the user and the both left and right operating amount sensors 30 detect rearward loads, each of which is a predetermined value or more, the both left and right electric motors 40L and 40R are driven to rotate in a backward direction, and the electric walking assisting vehicle 1 moves backward and assists backward walking of a user. Also, in the case of moving backward, a difference between values detected by the left and right operating amount sensors 30 is disregarded, the left and right electric motors 40L and 40R are driven to rotate at numbers of revolutions which are same as each other.

Turning-left forward: As indicated by a solid line in FIG. 2C, when a user pushes the right grip 32 (R) forward and the right operating amount sensor 30 detects a forward load whose value is a predetermined value or more, only the right electric motor 40R is driven to rotate in the forward direction, and the electric walking assisting vehicle 1 performs turning-left forward with the left driving wheel 4 (L) at rest as a center (TLa).

Turning-left backward: As indicated by a broken line in FIG. 2C, when a user pulls the left grip 32 (L) toward the user and the left operating amount sensor 30 detects a rearward load whose value is a predetermined value or more, only the left electric motor 40L is driven to rotate in the backward direction, and the electric walking assisting vehicle 1 performs turning-left backward with the right driving wheel 4 (R) at rest as a center (TLb).

Turning-left on the spot: As indicated by a solid line in FIG. 2C, when a user pushes the right grip 32 (R) forward, and concurrently, as indicated by a broken line in FIG. 2C, a user pulls the left grip 32 (L) toward the user, and the right operating amount sensor 30 detects a frontward load for which the value is a predetermined value or more, and concurrently, the left operating amount sensor 30 detects a rearward load for which the value is a predetermined value or more, the right electric motor 40R is driven to rotate in the forward direction, and concurrently, the left electric motor 40L is driven to rotate in the backward direction, and the electric walking assisting vehicle 1 performs turning in a left direction on the spot (TLs).

Turning-right forward: As indicated by a solid line in FIG. 2D, a user pushes the left grip 32 (L) forward and the left operating amount sensor 30 detects a frontward load whose value is a predetermined value or more, only the left electric motor 40L is driven to rotate in the forward direction, and the electric walking assisting vehicle 1 performs turning-right forward with the right driving wheel 4 (R) as a center (TRa).

Turning-right backward: As indicated by a broken line in FIG. 2D, when a user pulls the right grip 32 (R) toward the user and the right operating amount sensor 30 detects a rearward load for which the value is a predetermined value or more, only the right electric motor 40R is driven to rotate in the backward direction, and the electric walking assisting vehicle 1 performs turning-left backward with the left driving wheel 4 (L) at rest as a center (TRb).

Turning-right on the spot: As indicated by a solid line in FIG. 2D, when a user pushes the left grip 32 (L) forward, and concurrently, as indicated by a broken line in FIG. 2D, the user pulls the right grip 32 (R) toward the user, and the left operating amount sensor 30 detects a frontward load for which the value is a predetermined value or more, and concurrently, the right operating amount sensor 30 detects a rearward load for which the value is a predetermined value or more, the left electric motor 40L is driven to rotate in the forward direction, and concurrently, the right electric motor 40R is driven to rotate in the backward direction, and the electric walking assisting vehicle 1 thereby performs turning in a right direction on the spot (TRs).

The basic controlling of the left and right electric motors 40L and 40R in the above-described operations is controlling thereof when traveling on flat land for which the value of inclination is less than a predetermined threshold value, and for traveling on an uphill road and a downhill road, assisting in consideration of inclination is performed. Furthermore, when baggage is loaded thereon, assisting in consideration of a carrying weight of the baggage is performed. Hereinafter, the abovementioned configuration and torque controlling will be described.

Figure 3:
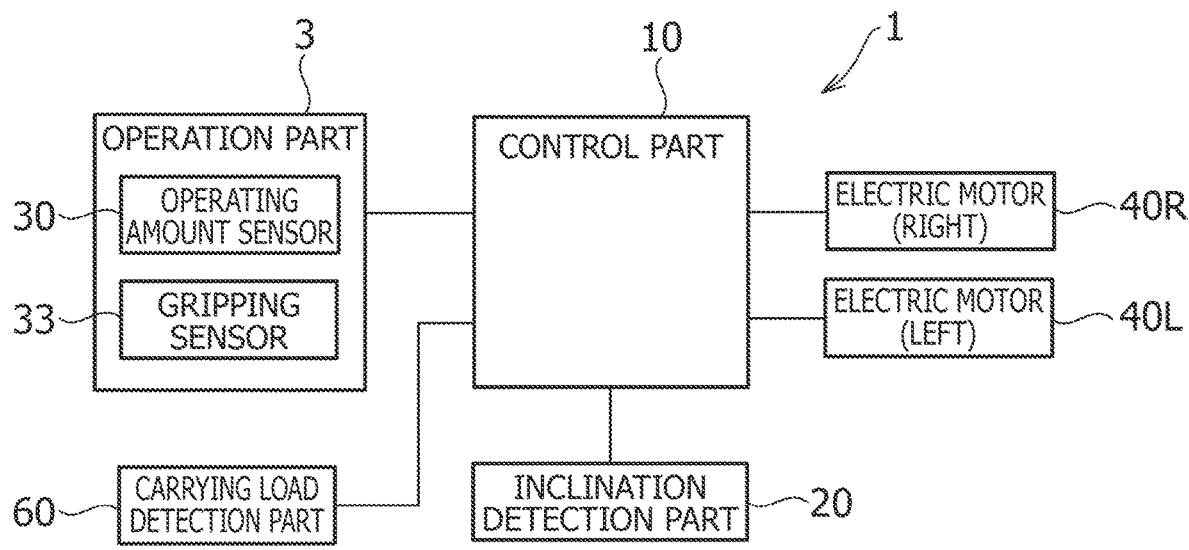
FIG. 3 is a block diagram showing a control system of the electric walking assisting vehicle according to the Embodiment of the present invention.

FIG. 3 is a block diagram showing a control system of the electric walking assisting vehicle in consideration of the inclination and the carrying weight. A control part 10 is configured such that input signals from the operation part 3 (the operating amount sensors 30 and the gripping sensors 33) and values detected by an inclination detection part 20 and a carrying load detection part 60 are inputted to the control part 10 and in consideration of the input signals and the detected values, controlling amounts of the left and right electric motors 40L and 40R are determined.

Figure 4:
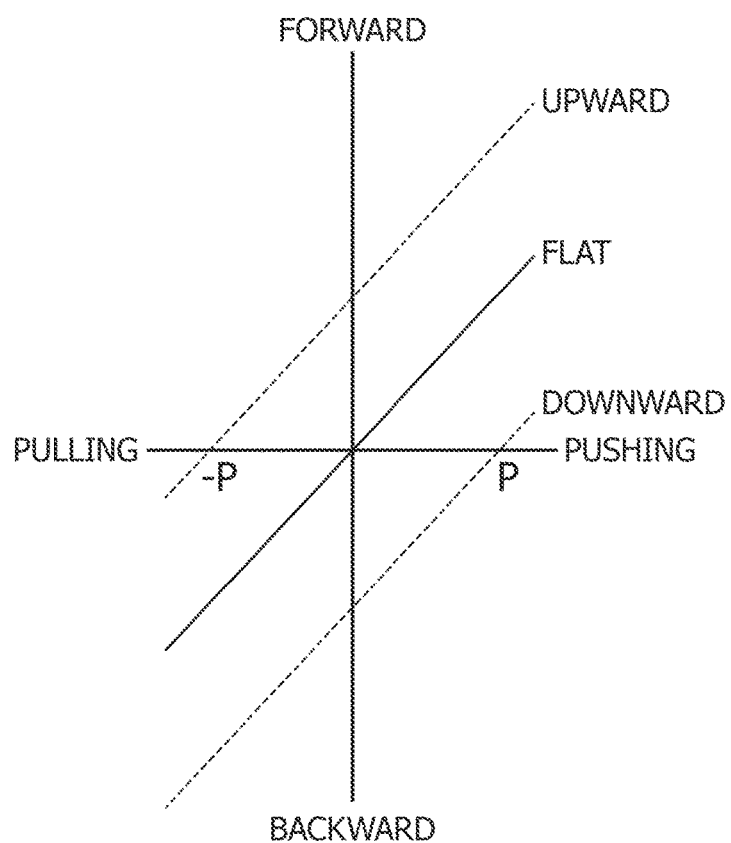
FIG. 4 is a graph showing torque control in the electric walking assisting vehicle according to the Embodiment of the present invention.

FIG. 4 is a graph showing torque control for assisting in consideration of the inclination (input operating amount-output torque line diagram), and a horizontal axis corresponds to operating amounts (load values) inputted to the operating sensors 30 and a vertical axis corresponds to output torque of the electric motors 40L and 40R.

In FIG. 4, when traveling on flat land, as indicated by a solid line in FIG. 4, the origin (neutral position) of operating amounts on a pushing side/a pulling side coincides with the origin of output torque, and as described above, in accordance with operation performed by a user on a pushing side (a predetermined value or more), torque output in a forward direction is controlled and in accordance with operation on a pulling side (a predetermined value or more), torque output in a backward direction is controlled. As shown in FIG. 1, on flat land 90, moving forward in which a pushing force of a user is assisted and moving backward in which a pulling force of the user is assisted, are enabled.

Figure 6:
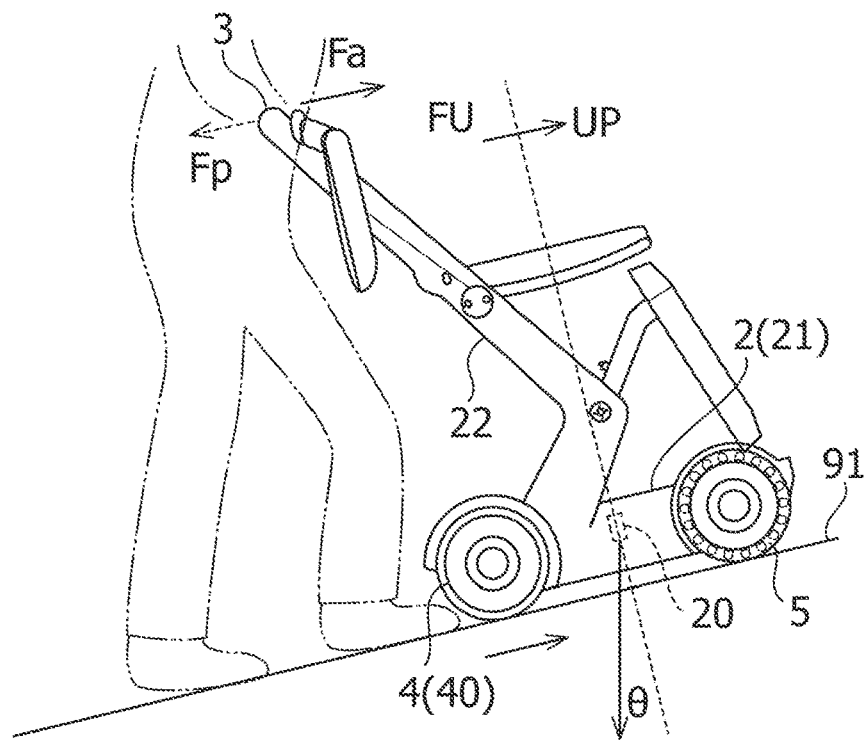
FIG. 6 is a side view of the electric walking assisting vehicle according to the Embodiment of the present invention during traveling on an uphill road.

On the other hand, when traveling on an uphill road, as indicated by a broken line on an upper side in FIG. 4, the origin of output torque is shifted to a pulling side with respect to the origin (neutral position) of operating amounts on a pushing side/a pulling side. Thus, when traveling on the uphill road, as compared with the traveling on flat land, large torque is output, and in a case of pulling operation having less than a predetermined value P, torque in a forward direction is output and thus, as shown in FIG. 6, on an uphill road 91, a propulsive force Fa against a pulling force Fp (less than a predetermined value P) of a user can be obtained, assisting of pulling hands of a user is enabled. In addition, the electric motors 40L and 40R are stopped by pulling operation having the predetermined value P or more.

Figure 7:
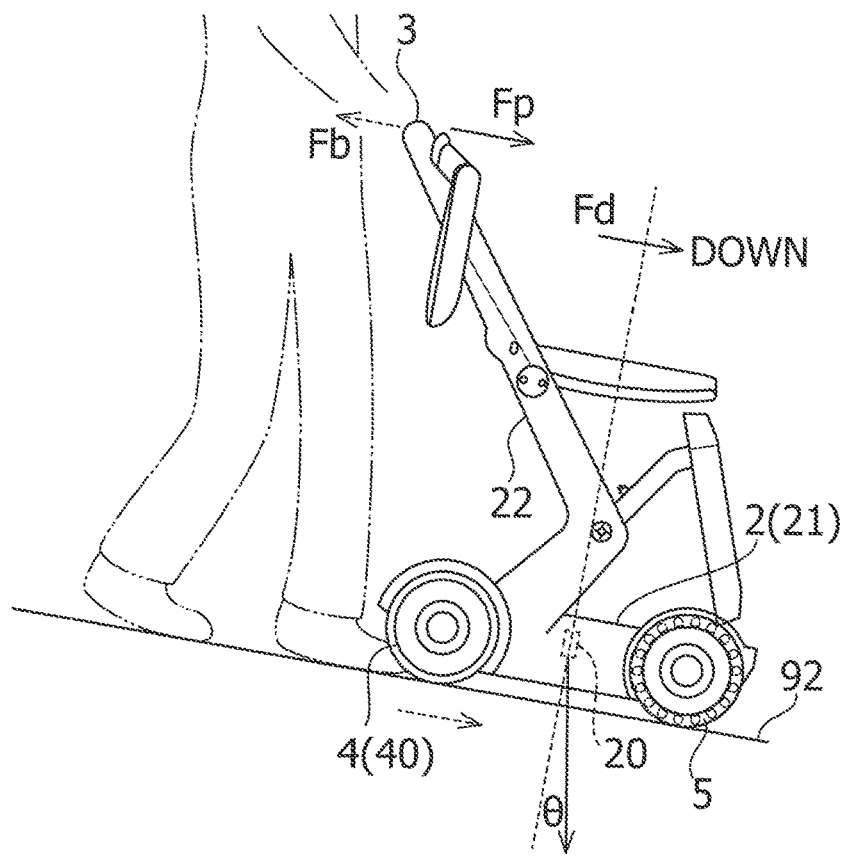
FIG. 7 is a side view of the electric walking assisting vehicle according to the Embodiment of the present invention during traveling on a downhill road.

Conversely, when traveling on a downhill road, as indicated by a broken line on a lower side in FIG. 4, the origin of output torque is shifted to a pushing side with respect to the origin (neutral position) of operating amounts on a pushing side/a pulling side. Thus, when traveling on the downhill road, as compared with when traveling on the flat land, output torque is suppressed, and in a case of pushing operation having less than the predetermined value P, torque in a negative direction is outputted and thus, as shown in FIG. 7, on a downhill road 92, a braking force Fb (regenerative power) against a pushing force Fp of a user can be obtained, and assisting of braking a user is enabled. In addition, the electric motors 40L and 40R are stopped by pulling operation having the operating origin or more.

Figure 8:
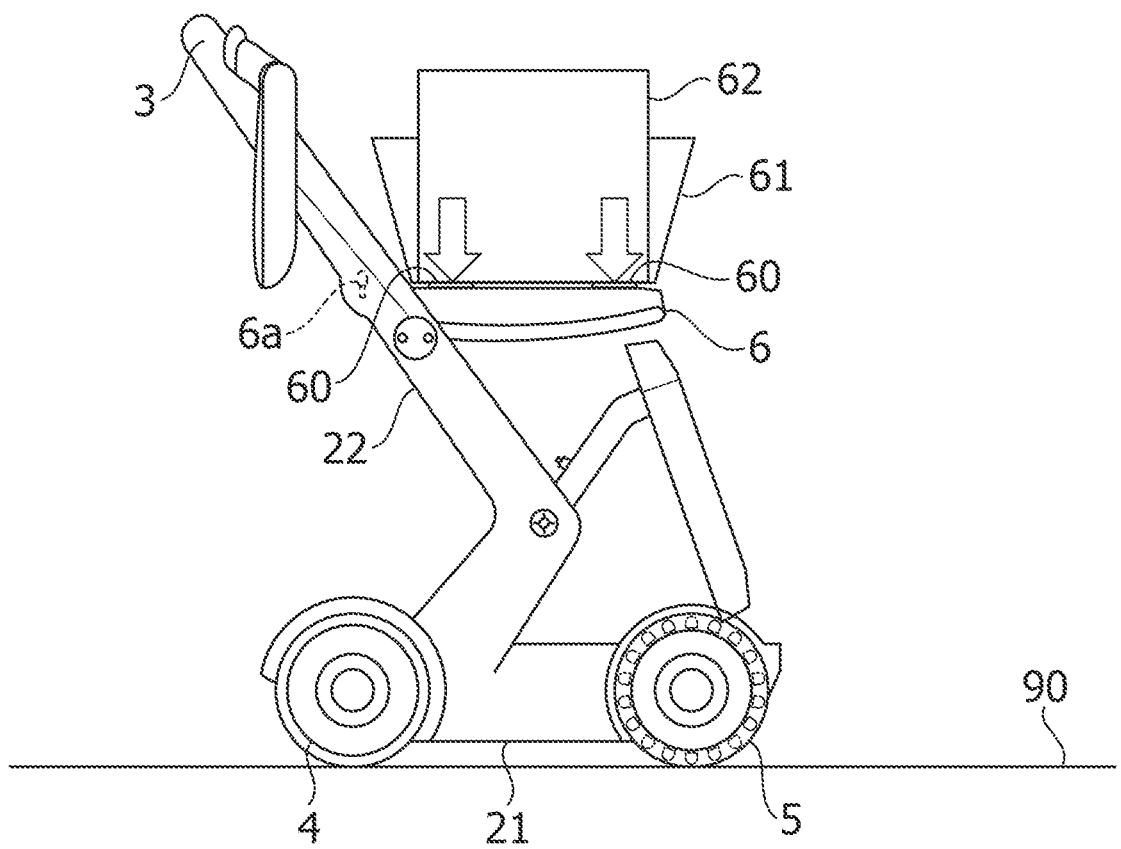
FIG. 8 is a side view of the electric walking assisting vehicle according to the Embodiment of the present invention, in a state in which baggage is loaded thereon.

In addition, as shown in FIG. 8, a carrying load of baggage 62 which is put into a case 61 is detected by load sensors (the carrying load detection part 60) on an upper surface of a cargo bed (the back surface of the seat back 6), and in accordance with values detected by the load sensors, output torque of the electric motors 40L and 40R is added or multiplied. Thus, a reduction in mobility in association with an increase in the weight of the baggage 62 is compensated, and operability which conforms to that in a state in which no baggage is loaded can be obtained.

Note that the carrying load detection part 60 can also be provided on the shaft 6a of the seat back 6, which is pivotably supported on the upper frame 22, a stopper (rotation stopper for retaining the seat back 6 in a horizontal cargo bed position) of the seat back 6 which is attached in a neighboring portion of the shaft 6a, or the like.

Figure 5:
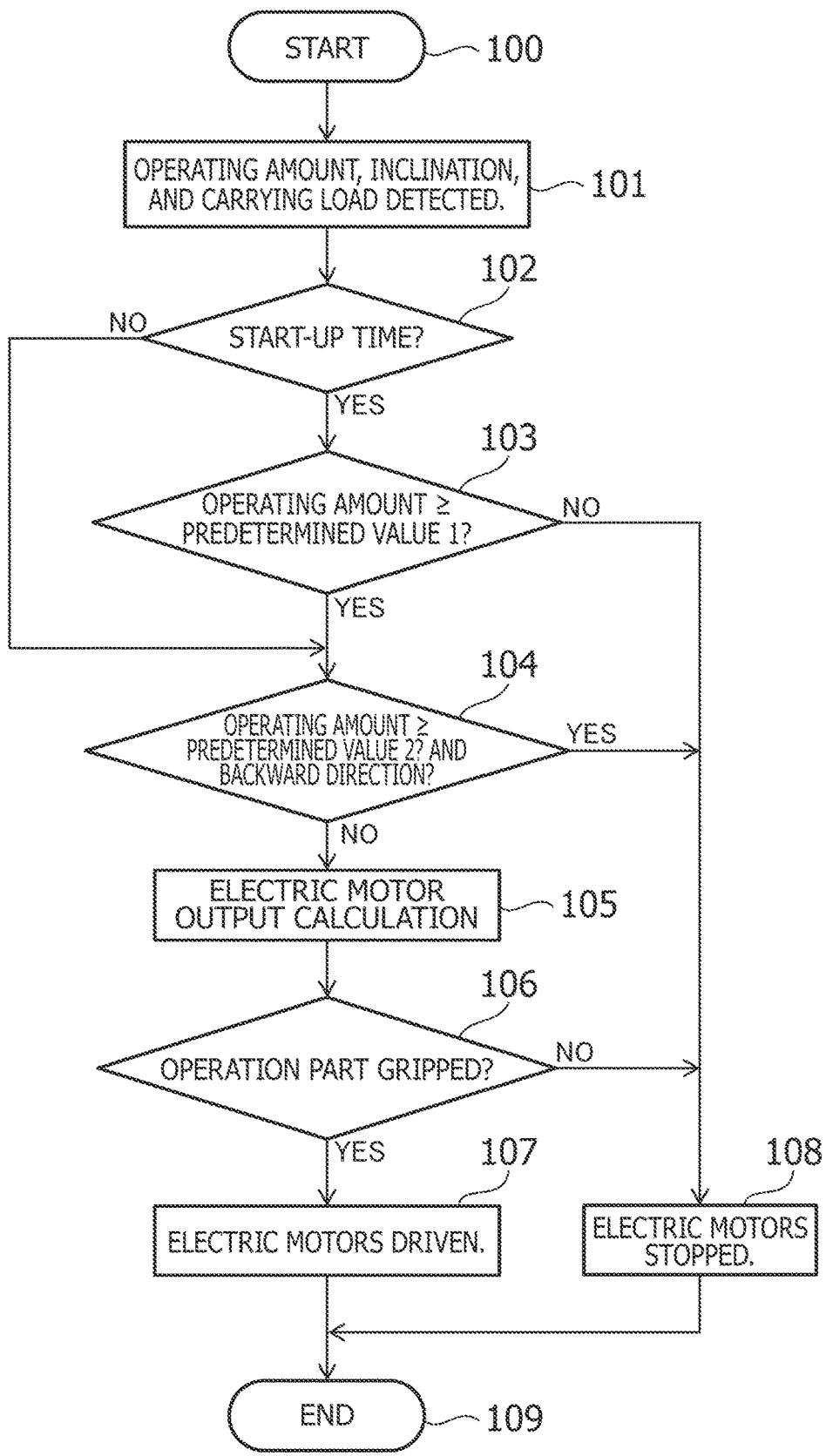
FIG. 5 is a flowchart showing control of the electric walking assisting vehicle according to the Embodiment of the present invention.

Next, controlling of the electric motors in the electric walking assisting vehicle 1 in consideration of the inclination and the carrying weight as described above will be described with reference to a flowchart in FIG. 5.

First, when the electric walking assisting vehicle 1 is powered on and the system is thereby activated (step 100), detection of the operating amount sensors 30 is set in a stand-by state. When values detected by the operating amount sensors 30 are present, those values as well as values detected by the inclination detection part 20 and by the carrying load detection part 60 at that time are acquired into the control part 10 (step 101).

Subsequently, it is determined whether or not it is start-up time (step 102), and when it is the start-up time (when the electric walking assisting vehicle 1 is not traveling, the start-up time is set immediately after the activation), it is determined whether or not each of the operating amounts detected by the operating amount sensors 30 is a predetermined value 1 or more (step 103). When each of the operating amounts is not the predetermined value 1 or more, the electric motors 40L and 40R are not activated (step 108).

When each of the operating amounts is the predetermined value 1 or more or it is not the start-up time (when the electric walking assisting vehicle 1 is traveling), it is determined whether or not the operating amounts are those in a backward direction and whether or not each of the operating amounts is a predetermined value 2 or more (step 104). When the operating amounts are not those in the backward direction, that is, when each of the operating amounts in a forward direction is the predetermined value 2 or more, outputs of the electric motors 40L and 40R are calculated based on the detected values acquired in step 101 (step 105). In addition, when each of the operating amounts in the backward direction is the predetermined value 2 or more, the electric motors 40L and 40R are stopped (step 108). Note that the predetermined value 2 is smaller than the predetermined value 1.

Subsequently, it is determined whether or not a user is gripping the operation part 3 (grips 32) based on detected values from the gripping sensors 33 (step 106). When the gripping state is detected, the electric motors 40L and 40R are driven so as to achieve the values of the outputs calculated in step 105 (step 107).

Hereinbefore, the Embodiment of the present invention is described. However, the present invention is not limited to the above-described Embodiment, and a variety of variations and modifications of the present invention can be further made based on the technical concept of the present invention.

For example, in the above-described Embodiment, the case in which as the operating amount sensors 30, the load sensors respectively inserted between the supporting bodies 31*a* of the handle bar 31 on the left and right sides and the supporting holes 22*a* of the upper frame 22 is described. However, long holes (guide slots) extending in a vehicle forward-backward direction are substituted for the supporting holes 22*a* of upper frame 22, and the supporting bodies 31*a* of the handle bar 31 on the left and right sides are configured to be slidable forward and backward along the long holes (22*a*), and elastic bodies (springs) are interposed respectively between front and rear sides of the supporting bodies 31*a* (sliders), the supporting bodies 31*a* are held in the origin (neutral position) by elastic resilience force of the elastic bodies when no operating forces are acting. Displacement sensors which detect displacement of these supporting bodies 31*a* as operating amounts can also be used in the configuration.

In addition, in the above-described Embodiment, the case in which as the operation part 3, the left and right grips 32 and the operating amount sensors 30 are provided on the left-right integrated handle bar 31 is described. However, the grips 32 and the operating amount sensors 30 may be provided on left and right independent handles. In this case, the handles can be supported in the form of a cantilever or can also be supported in the form in which the left and right handles are independently rotatable and are provided with reactive forces.

Furthermore, in the above-described Embodiment, the case in which the electric walking assisting vehicle 1 has the compact electric vehicle mode is described. However, the present invention can be implemented as an electric walking assisting vehicle which has no compact electric vehicle mode.

In addition, in the above-described Embodiment, the case in which as the driven wheels 5, the omni wheels are used is described. However, driven wheels which are supported in the form of casters in a steerable manner and are not the omni wheels can also be used.

What is claimed is:

1. An electric walking assisting vehicle comprising:
   a vehicle body having a forward-backward direction and a width direction;
   driving wheels being driven by a driving motor mounted on the vehicle body;
   driven wheels provided away from the driving wheels in the forward-backward direction of the vehicle body; and
   an operation part provided on an upper portion of the vehicle body so as to enable a user in a standing and walking posture to grip the operation part,
   wherein the driving motor is controlled in accordance with an operating amount acting on the operation part,
   wherein the driven wheels are constituted of omni wheels or are supported in a steerable manner, the operation part includes left and right operation parts, the driving motor includes left and right driving motors, the driving wheels are operable to be left-and-right-independently driven and thereby turned by the left and right driving motors associated with the left and right operation parts; and
   wherein the vehicle comprises an inclination detection part detecting an inclination in the forward-backward direction of the vehicle body,
   on flat land on which the inclination is less than a threshold value, with respect to operation origin of the operation part, the driving motor is controlled so as to be caused to generate output torque in a forward direction by operation of pushing the operation part forward and to generate output torque in a backward direction by operation of pulling the operation part backward,
   on an uphill road on which the inclination is the threshold value or more, the origin of output torque corresponding to the operation origin is shifted to a pulling operation side, and
   on a downhill road on which the inclination is the threshold value or more, the origin of output torque corresponding to the operation origin is shifted to a pushing operation side.

2. The electric walking assisting vehicle according to claim 1, wherein
   on the uphill road on which the inclination is the threshold value or more, when a pulling operation amount exceeding an operation amount corresponding to the shifted origin of the output torque acts on the operation part, the driving motor is stopped, and
   on the downhill road on which the inclination is the threshold value or more, when a pulling operation amount exceeding the operation origin-acts on the operation part, the driving motor is stopped.

3. The electric walking assisting vehicle according to claim 1, further comprising a load sensor detecting a carrying load of the vehicle body, wherein in accordance with a value detected by the load sensor, output of the driving motor is controlled.

4. The electric walking assisting vehicle according to claim 1, wherein the operation part further includes a gripping sensor detecting gripping by a user, and when a value detected by the gripping sensor is less than a predetermined value, driving of the driving motor is stopped.

5. The electric walking assisting vehicle according to claim 1, wherein when starting to travel from a stop state, when an operating amount acting on the operation part is a predetermined value or more, the driving of the driving motor is started.

6. The electric walking assisting vehicle according to claim 1, wherein during traveling, when an operating amount acting on the operation part in the backward direction is the predetermined value or more, the driving of the driving motor is stopped.

7. The electric walking assisting vehicle according to claim 1, wherein the vehicle body includes a foldable seat and an operation part being operable to be operated by a user seated on the seat, and the electric walking assisting vehicle is operable to be used as a compact electric vehicle.

* * * * *